March 31, 1925.
E. J. SCHNEITER
PUMP
Filed Dec. 3, 1923
1,531,985
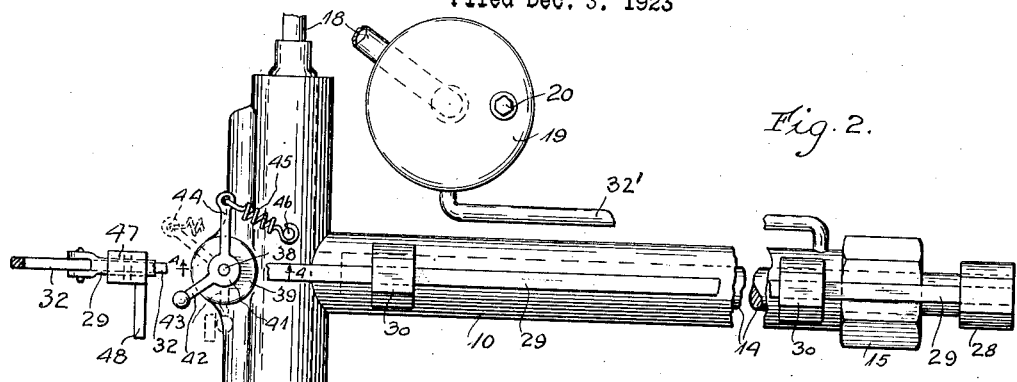
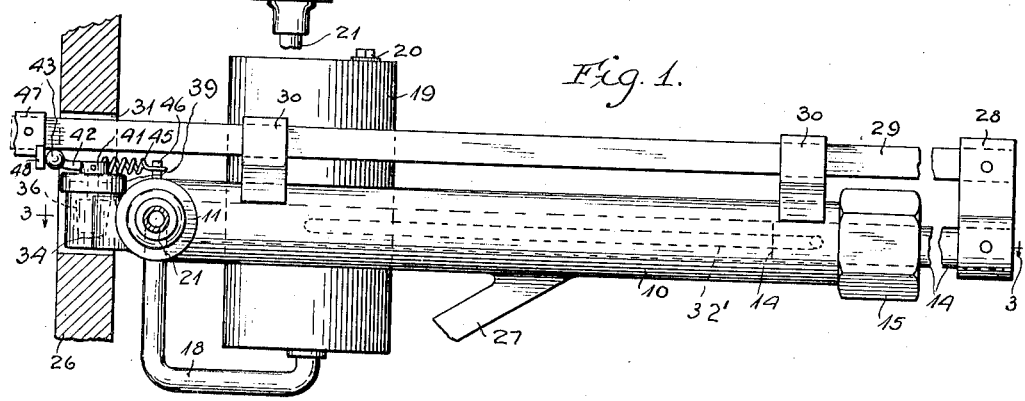
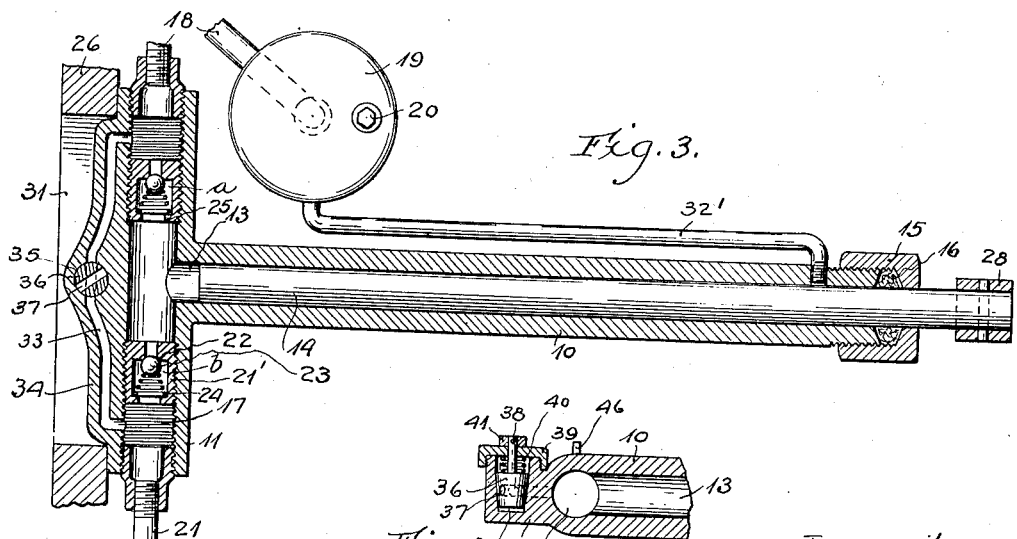
Inventor,
Edward J. Schneiter
By Charles J. Schmidt.
Atty.

Patented Mar. 31, 1925.

1,531,985

UNITED STATES PATENT OFFICE.

EDWARD J. SCHNEITER, OF CHICAGO, ILLINOIS.

PUMP.

Application filed December 3, 1923. Serial No. 678,102.

*To all whom it may concern:*

Be it known that I, EDWARD J. SCHNEITER, a citizen of the United States, and a resident of Chicago, in the county of Cook and State of Illinois, have invented certain new and useful Improvements in Pumps, of which the following is a specification.

My invention relates to pumps particularly to fluid pressure producing pumps which are especially adaptable for use in connection with the fluid brakes of automotive vehicles. The object of the invention is to provide a simple, compact and efficient pump outfit which can be readily installed within small space in a vehicle and controlled by the driver with little physical exertion to force fluid under heavy pressure into the cylinders of the hydraulic brake mechanism associated with the wheels of the vehicle.

My improved construction and arrangement is clearly shown on the accompanying drawing, in which, Fig. 1 is a side elevational view of the pump outfit, Fig. 2 is a plan view, Fig. 3 is a sectional view on plane 3—3, Fig. 1, and Fig. 4 is a sectional view on plane 4—4, Fig. 1.

The pump structure frame comprises the plunger barrel or cylinder 10 and the transverse valve tube 11. The cylinder has the comparatively small bore 13 into which snugly fits the plunger 14, a stuffing gland 15 threadedly receiving the outer end of the cylinder to hold packing material 16 around the plunger to prevent leakage. The valve tube 11 has the threaded bore 17 with which the cylinder bore communicates. From one end of the tube extends the conduit 18 which connects with the lower end of the reservoir 19 for fluid such as oil, which can be filled into the tank through a plug controlled opening 20. The other end of the valve tube is connected by a service pipe 21 with the cylinders (not shown) of the hydraulic brakes which are to be served. Between the inlet end of the cylinder bore and the conduit 18 the check valve structure *a* is disposed within the valve tube, and between the cylinder bore and the outlet pipe 21 a similar check valve structure *b* is disposed within the tube. Each of these valve structures comprises the externally threaded frame 21' which can be threaded into the valve tube to the proper position. Each frame has the seat 22 for the ball valve 23, and a spring 24 interposed between the ball valve and the flange 25 for keeping the ball valve on its seat when not under pressure. The valve structure *a* is positioned to permit flow of fluid from the reservoir into the cylinder bore but to check flow in the opposite direction, while the valve structure *b* is arranged to permit flow of fluid from the cylinder to the supply pipe 21 but to check flow in the opposite direction.

The pump structure can be conveniently arranged in a vehicle under the engine hood in front of the dashboard 26 from which it may be supported by suitable brackets or arms 27. To the outer end of the plunger is rigidly secure the coupling block 28 which at its upper end is secured to the adjacent end of the bar 29 which is guided in guide brackets 30 on top of the cylinder 10, the bar extending through the opening 31 in the dashboard to a suitable lever 32 positioned to be readily manipulated by the vehicle driver. With the arrangement shown when the lever is swung inwardly the plunger will be moved in the cylinder to draw oil from the reservoir past the valve structure *a* into the cylinder bore, and then when the lever 32 is swung outwardly the drawn in fluid will be prevented by the valve structure *a* from returning to the reservoir and will be forced out past the valve structure *b* into and through the piping 21 to the brake cylinders to effect braking. Owing to the small bore of the cylinder and the comparatively long stroke of the plunger fluid under very heavy pressure will be transmitted to the brake cylinders with little physical exertion on the part of the vehicle driver and powerful braking can be accomplished.

Owing to the high pressure, some of the oil may squeeze through between the plunger and the cylinder wall, and to prevent escape of this oil into the open, I provide a return pipe 32' for the oil to the reservoir. This pipe connects with the cylinder at its outer end and any oil that gets past the plunger can then find its way through this return pipe back to the reservoir.

In order to relieve the pressure so that quick release of the brakes may be accomplished I provide the relief passageway or by-pass 33 in the enlargement 34 on the valve tube 11. This relief passageway communicates at its ends with the valve tube outside of the respective valve structures $a$ and $b$. Intermediate the ends of the passageway I provide a conical valve pocket 35 for the conical valve plug 36 which has the valve passageway 37 extended diametrically therethrough. The stem 38 of the valve extends through the cover 39 for the valve pocket, a compression spring 40 being interposed between the cover and the valve to keep the valve snugly on its seat. The upper end of the stem is secured to the hub 41 from which extends the arm 42 terminating in the rounded end 43. Another arm 44 extends from the hub and is connected by the spring 45 with the post 46, the spring serving to hold the valve plug normally in position with the valve passageway 37 extending transversely of the relief passageway 33 in order to close such passageway.

At the outer end of the bar 29 is secured the block 47 from which extends the abutment arm 48 for engaging with the arm 42 of the valve structure to rotate the valve plug to bring its valve passageway into registration with the relief passageway 33. Normally the operating lever 32 is in upright position with the abutment 48 just in front of the valve arm 42, and the plunger is in its outer position as indicated in Fig. 1. When it is desired to brake, the operator swings the lever 32 outwardly to draw with it the bar 29 and to force the plunger through the cylinder from which the oil previously taken in will then be ejected under heavy pressure through the pipe 21 to the brake cylinders. If extra heavy pressure is desired the operator will perform several operations of the plunger. When he desires to release the brakes he will swing the lever 32 forwardly beyond its normal position in order to bring the abutment 48 against the end 43 of the lever arm 42 and to swing this arm into the position shown in dotted lines in Fig. 2, which swing will result in turning of the valve plug 36 to bring its passageway 37 into line with the relief passageway 33, and then the oil pressure in the system will relieve itself through such relief passageway into the reservoir. The operator can thus operate the pump to get the braking pressure he desires and will then restore the lever 32 to its normal position with the abutment 48 in front of the arm 42. Then when release of the brakes is desired a slight inward movement of the lever will cause rotation of the relief valve and relief of the pressure. When the arm 42 is released, the spring 45 will quickly restore the valve into position to close the relief passageway. I thus produce simple, strong and efficient pump mechanism which can be used with any hydraulic brake outfit for delivering fluid under heavy braking pressure to cause rapid powerful braking and which permits the brakes to be readily and quickly released.

I do not desire to be limited to the exact construction and arrangement shown and described, as changes are possible which will still come within the scope of the invention.

I claim as follows:

1. In fluid pump mechanism of the class described, the combination of a frame comprising a cylinder and a valve chamber connected with the end of said cylinder, a support for said frame, a fluid reservoir connecting with one end of said valve chamber, a delivery pipe connecting with the other end of said valve chamber for delivering fluid under pressure, a check valve in said valve chamber between the cylinder end and said reservoir, a second check valve within said chamber between the cylinder end and said delivery pipe, a relief passageway leading directly from said delivery pipe to said reservoir, a relief valve normally closing said passageway, a plunger for said cylinder, a bar slidable on said frame and connected with the outer end of said plunger, a lever for operating said bar, and an abutment on said bar for cooperating with said release valve to cause opening of said release passageway.

2. In fluid pump mechanism of the class described, the combination of a cylinder, a valve housing at one end thereof, a plunger for said cylinder, said cylinder communicating with said valve housing intermediate its ends, a fuel reservoir connecting with one end of said housing, a supply pipe connecting with the other end of said housing for conducting fluid under pressure from said pump, a check valve within said housing between the cylinder end and said reservoir, a second check valve within said housing between the cylinder end and said supply pipe, a relief passageway through the housing walls connected at its ends with said valve chamber outside of said check valves, a relief valve for directly connecting said supply pipe with said reservoir for said passageway, an arm extending from said relief valve, a bar slidable on said cylinder and connected with the outer end of said plunger, means for operating said bar, and an abutment on said bar adapted to engage with said valve arm to control said valve to open said relief passageway when said plunger is in its outer position.

3. In fluid pump mechanism of the class described, the combination of a cylinder, a plunger therefor, a reservoir, a connection between said reservoir and cylinder, a check valve in said connection for preventing flow of fluid from the pump to the reservoir, a delivery connection for delivering fluid under pressure away from said cylinder, a check valve in said delivery connection for preventing flow of fluid back to the cylinder, a relief passageway leading from said delivery connection to said reservoir independently of said delivery connection check valve, a relief valve for controlling said relief passageway, means tending to hold said relief valve normally closed, actuating mechanisms for shifting said plunger in and out, and an abutment on said actuating mechanism for cooperating with said relief valve to open said valve at the end of the outward movement of said plunger.

In witness whereof, I hereunto subscribe my name this 28th day of November, A. D., 1923.

EDWARD J. SCHNEITER.